J. M. NELSON.
MOTOR CYCLE STAND.
APPLICATION FILED OCT. 29, 1914.
1,134,893.
Patented Apr. 6, 1915.
3 SHEETS—SHEET 2.
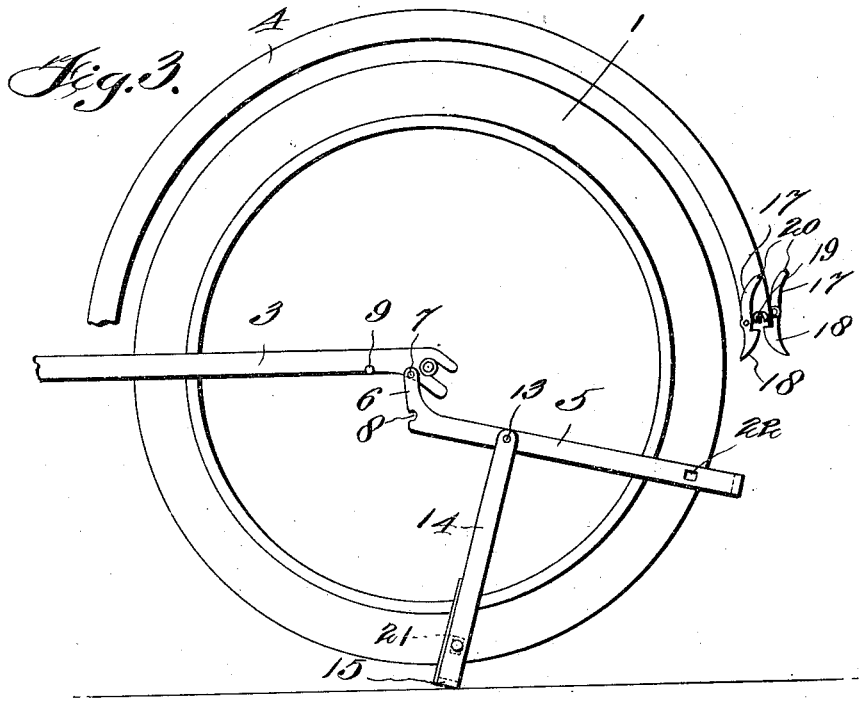
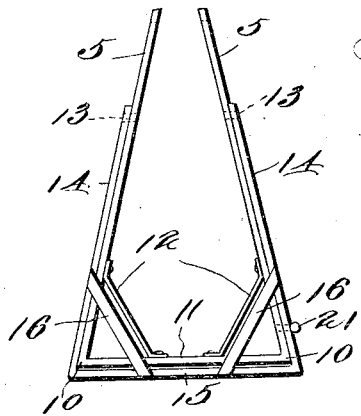
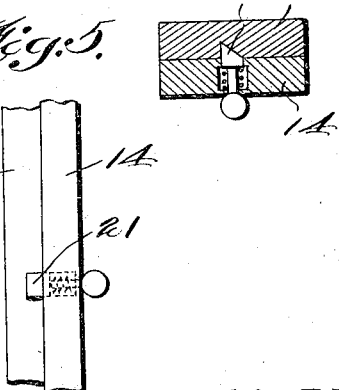
Inventor
John M. Nelson, J. M. NELSON.
MOTOR CYCLE STAND.
APPLICATION FILED OCT. 29, 1914.
1,134,893.
Patented Apr. 6, 1915.
3 SHEETS—SHEET 3.
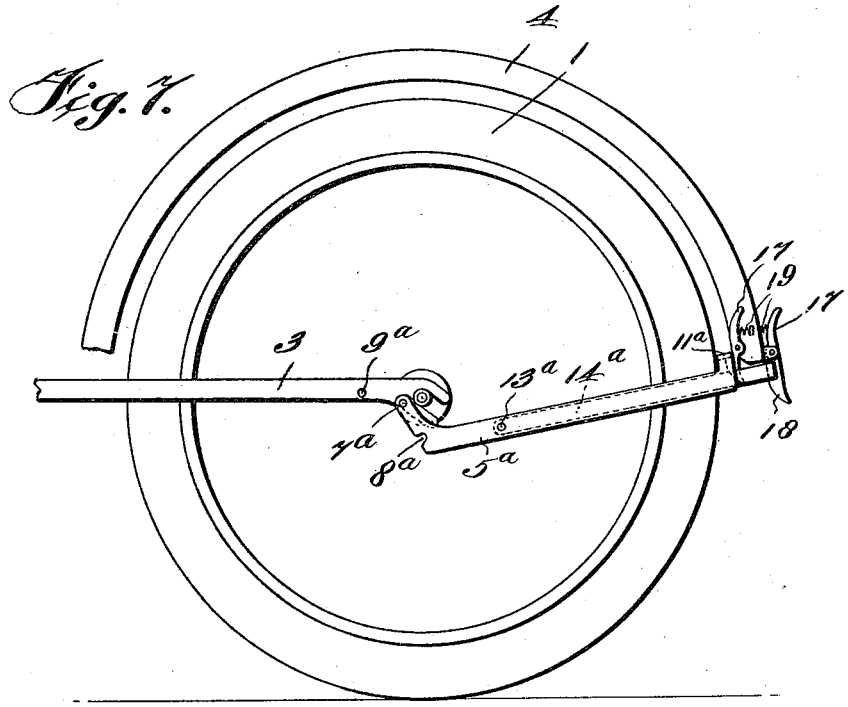
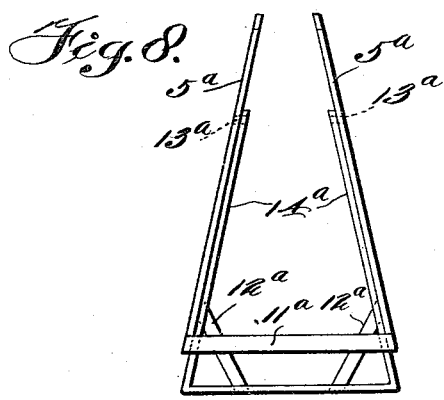

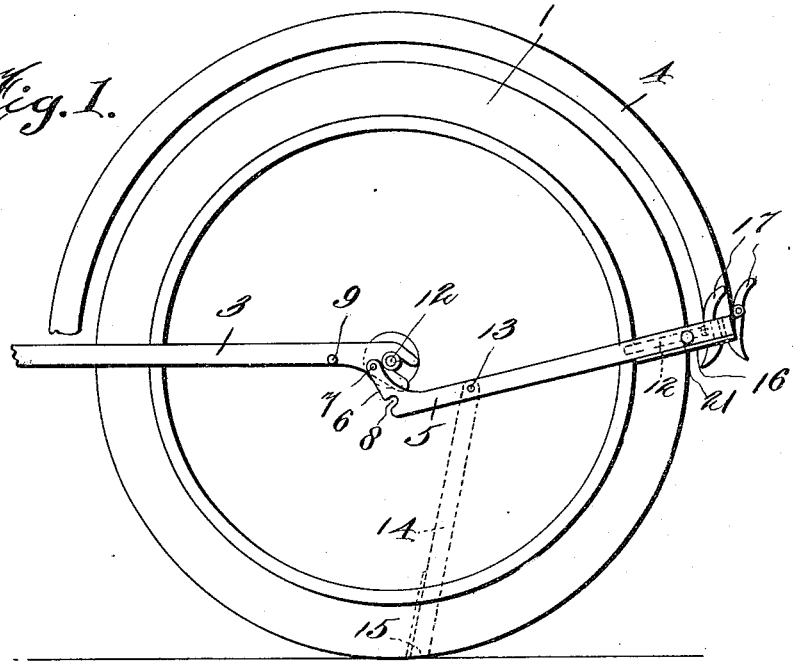
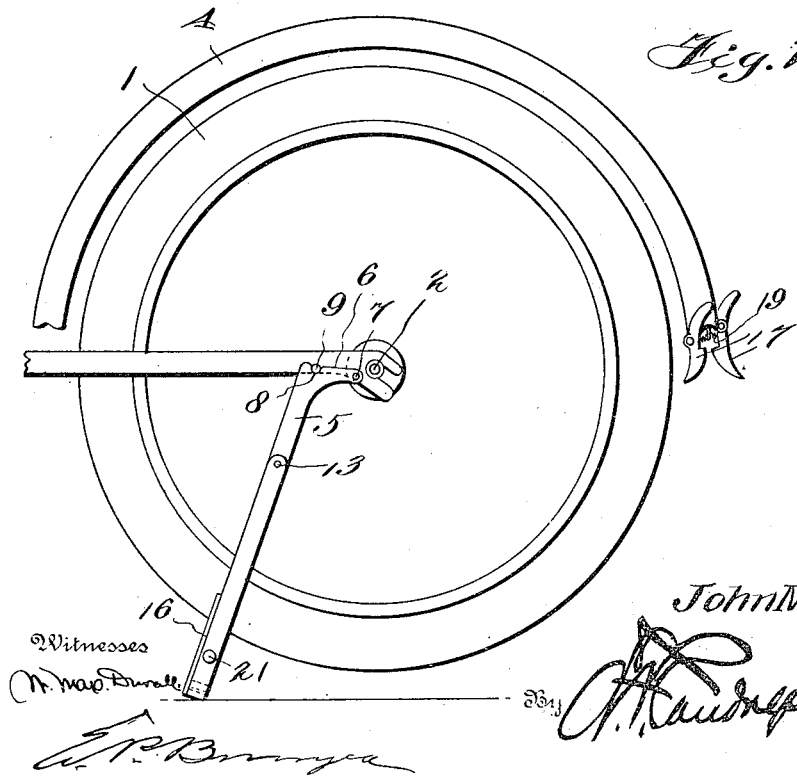

UNITED STATES PATENT OFFICE.

JOHN M. NELSON, OF DULUTH, MINNESOTA.

MOTOR-CYCLE STAND.

1,134,893.  Specification of Letters Patent.  Patented Apr. 6, 1915.

Application filed October 29, 1914. Serial No. 869,261.

*To all whom it may concern:*

Be it known that I, JOHN M. NELSON, a citizen of the United States, residing at Duluth, in the county of St. Louis and State of Minnesota, have invented certain new and useful Improvements in Motor-Cycle Stands; and I do hereby declare the following to be a full, clear, and exact description of the invention, such as will enable others skilled in the art to which it appertains to make and use the same.

This invention relates to motorcycle stands, and one of the principal objects of the invention is to provide a motorcycle stand which will be comparatively simple in construction, reliable in operation, and which can be operated by a person without the expenditure of great strength or energy.

Another object of the invention is to provide a motorcycle stand which can be thrown down in position for supporting the motor-cycle in an upright position and which will not require lifting the machine for adjusting the stand to support the machine.

The foregoing and other objects may be attained by means of the construction illustrated in the accompanying drawings, in which, Figure 1 is a side elevation of the motor-cycle stand made in accordance with this invention, and shown suspended on the mud-guard of the rear wheel, and showing one member of the stand thrown down and shown in dotted lines, Fig. 2 is a side elevation showing the stand thrown down for supporting the rear wheel and holding the machine upright, Fig. 3 is a side elevation of the stand during the process of operation, Fig. 4 is a front elevation of the two frame bars of the stand closed, Fig. 5 is a detail elevation of the catch for holding the two members of the stand together when in vertical position, Fig. 6 is a sectional view of the same, Fig. 7 is a side view of a slightly modified form of the invention, and Fig. 8 is an end view of the motorcycle stand shown in Fig. 7.

Referring to the drawings, the numeral 1 designates the rear wheel of a motorcycle, 2 is the axle thereof and 3 is one of the frame bars, while 4 is the mud-guard. These parts may be of the usual or any suitable construction.

The motorcycle stand comprises the inner and longer member consisting of a piece of channel steel of the required size and strength bent up into a frame having converging upper ends 5, and said ends being provided with an angular arm or offset portion 6. The ends of the arms 6 are pivoted at 7 to the frame bar 3 and notches 8 are formed in said bars substantially in alinement with the vertical converging members 5. A pin or stop 9 on the frame bar 3 engages the notches 8, when the stand is thrown down in position to support the rear wheel of the motorcycle. The lower ends of the bars 5 diverge and are bent at 10 to form the horizontal supporting member 11 and suitable diagonal braces 12 extend from the base member 11 to the side members 5.

Pivoted at 13 to the sides of the members 5 is an outer frame comprising channel steel bars 14 which conform to the shape of the inner frame but are shorter, said bars 14 being bent at their corners to form the base member 15, and suitable braces 16 extend diagonally from sides of the base 15, as shown more clearly in Fig. 4.

Connected to the rear ends of the mud-guard 4 are clasps 17 having divergent lower ends 18, and said clasps being operated by means of a spring 19. The outer ends 20 of the clasps are curved away from the mud-guard, so that they can be readily operated by the foot to release the stand therefrom.

A spring bolt or latch 21 is connected to the members 14 and said spring latch is beveled upon its inner end to engage a recess 22 in the members 5 to hold the two frames connected and in operative position when down and to also hold them together when supported by the clasp 17.

As shown in Figs. 7 and 8, the inner and outer frames are transposed. The frame bars 5ª being provided with a notch 8ª and pivoted at 7ª to the frame bar 3, said bar being provided with a stop 9ª. The frame bars 5ª are disposed upon the outside of the inner frame comprising the bars 14ª pivoted at 13ª to the bars 5ª. The inner frame is provided with braces 12ª, and the outer frame is provided with a cross bar 11ª. As shown in Figs. 7 and 8, the longer members 5ª are disposed upon the outside and the shorter members 14 upon the inside. The operation is precisely the same as that of the device shown in the other figures.

From the foregoing it will be obvious that when the members 14 are thrown down by releasing the clasp 17 therefrom, that these members are just of sufficient length to reach to the ground at a point underneath the wheel. After the outer frame 14 is thrown down into the position shown in Fig. 3, the inner frame 5 is released from the clasps 17 and is pushed down with the foot until locked together by a spring latch 21, and said frames are prevented from moving one past the other by the braces 12 and 16, and said frame as a whole, is made to assume the position shown in Fig. 2 of the drawing, with the notch 8 engaging the pin 9 upon opposite sides of the frame bars 3. To throw the stand up in its operative position, both members may be thrown up together to engage the clasp member 17.

The invention is simple in construction, can not readily get out of order, can be operated by a person without the expenditure of power and can be manufactured at a comparatively low cost.

Various changes may be made in the details of construction without departing from the spirit and scope of the invention as defined in the claims.

What is claimed is:—

1. A motorcycle stand comprising an inner frame and an outer frame, said frames being pivotally connected together, and one of said frames being provided with angular arms at the upper ends, said arms being pivoted to the frame bars of the motorcycle, and provided with a notch to engage a pin on the frame bars, the other frame of said stand being provided with braces to prevent the first mentioned frame from passing through the same, and said frames when thrown down supporting the motorcycle in an upright position.

2. A motorcycle stand comprising an inner frame and an outer frame pivotally connected together, one of said frames having angular arms pivoted to the frame bars of the motorcycle and means for stopping said frames when in position to support the motorcycle, the outer frame of said stand being shorter and adapted to reach to the ground line, while the longer frame swings within the shorter frame when the rear wheel is pushed backward to support the motorcycle in vertical position, and means for preventing one frame from swinging through the other frame.

3. A motorcycle stand comprising an inner frame, and an outer frame pivoted thereto, one of said frames being longer than the other frame and provided with angular arms pivoted to the frame bars of the motorcycle, stops on said bars and notches in the longer frame, braces in both frames, a latch to prevent disconnection of the two frames, and means for holding said two frames in an upper inoperative position.

In testimony whereof I affix my signature in presence of two witnesses.

JOHN M. NELSON.

Witnesses:
C. F. O. TANSOR,
PAUL NELSON.